F. M. OPITZ.
AUTOMOBILE RADIATOR.
APPLICATION FILED MAY 9, 1919.
1,404,159.
Patented Jan. 17, 1922.
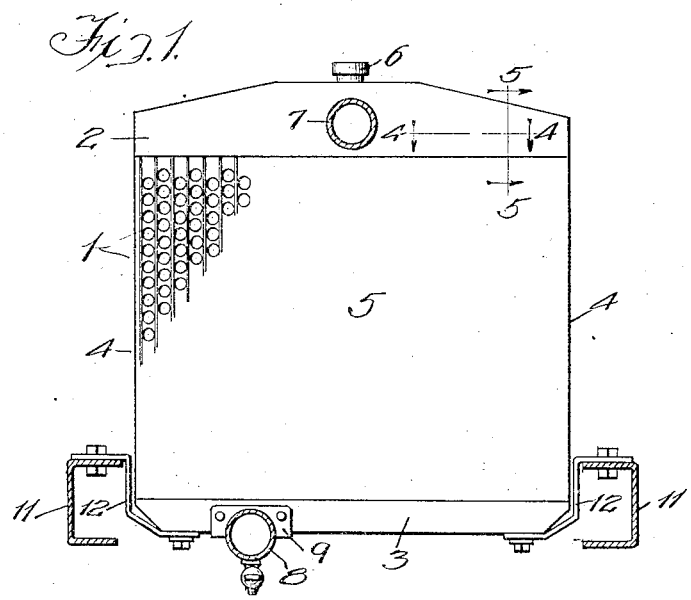
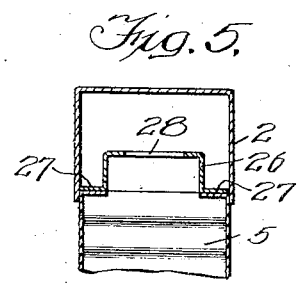
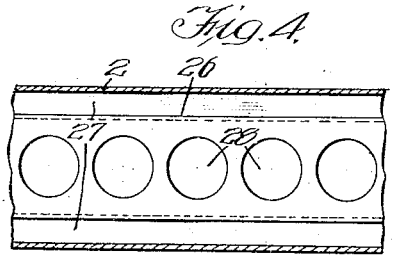
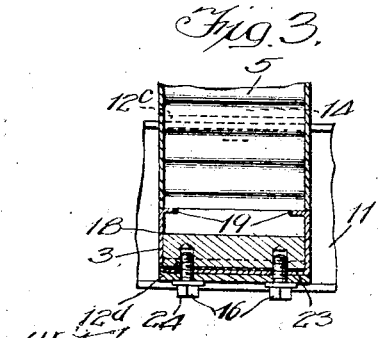
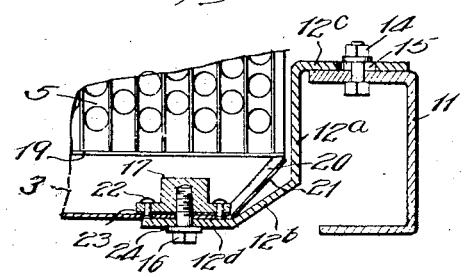
Witnesses:
W. F. Kilroy
Harry R. L. White
Inventor.
Fred M. Opitz,
By Brown Boettcher & Dienner
Attys.

UNITED STATES PATENT OFFICE.

FRED M. OPITZ, OF RACINE, WISCONSIN.

AUTOMOBILE RADIATOR.

1,404,159.  Specification of Letters Patent.  Patented Jan. 17, 1922.

Application filed May 9, 1919. Serial No. 295,352.

*To all whom it may concern:*

Be it known that I, FRED M. OPITZ, a citizen of the United States, residing at Racine, in the county of Racine and State of Wisconsin, have invented a certain new and useful Improvement in Automobile Radiators, of which the following is a full, clear, concise, and exact description, reference being had to the accompanying drawings, forming a part of this specification.

My invention relates to automobile radiators.

The primary object of my invention is to provide an improved form of suspension for mounting the radiator upon the automobile frame. The particular purpose of this new suspension is to prevent the transmission of injurious stresses from the automobile frame to the comparatively fragile radiator construction. The ordinary automobile frame is subject to strains caused by the natural flexing and distortion of the frame resulting from the running of the car, and it is the purpose of this new suspension to isolate the radiator from these strains by affording a yieldable support between the frame and radiator.

Another object of my invention is to provide an improved construction of header or water box at the bottom of the radiator for co-operating with the novel form of suspension.

Another object of my invention is to provide novel distributing means in the upper water box for distributing the incoming heated water uniformly over the entire series of core interstices opening into the upper water box. In the ordinary form of radiator construction, there is a tendency for the middle core openings, which are situated immediately under the hot water intake, to receive the larger portion of the heated water as it is discharged into the radiator, with the result that the circulation is mainly through the central portion of the core, thereby producing an uneven temperature distribution throughout the core and a loss of efficiency. This is avoided through the use of my improved distributing means which equalizes the circulation throughout the entire radiator and avoids unequal heating thereof.

In the accompanying drawings:

Figure 1 is a rear elevational view of a radiator embodying a preferred form of my invention;

Figure 2 is a fragmentary detail section of the lower water box and suspension bracket;

Figure 3 is a transverse section taken on the line 3—3 of Figure 2;

Figure 4 is an enlarged fragmentary section taken on the line 4—4 of Figure 1;

Figure 5 is an enlarged transverse section taken on the line 5—5 of Figure 1.

The radiator 1 comprises the upper water box 2, the lower water box 3, the side members 4—4 and the core structure 5. The core structure 5 may be of any preferred construction, although I preferably construct it in accordance with the practice disclosed in my co-pending application, Serial Number 200,252, filed November 5, 1917. The upper water box 2 is provided with the usual filler cap 6 and intake pipe 7. An outlet pipe 8 is attached to the lower water box 3 through an angle plate 9 which is riveted to the side and bottom of the water box 3.

The radiator 1 is slung between the side channels 11—11 of the chassis frame, by suspension brackets 12—12 which extend down from the upper flange of the channel 11 to a point beneath the water box 3. These suspension brackets form the elastic suspension for absorbing the injurious stresses developed in the chassis frame and prevent their transmission to the relatively fragile core structure 5. I find it preferable to make up these brackets of soft steel stampings which afford the desired degree of elasticity, but still have sufficient rigidity to prevent undue vibration of the radiator and to maintain it in its proper position.

Each of these brackets comprises the substantially vertical portion $12^a$, the diagonal portion $12^b$, and the two bolting extensions $12^c$ and $12^d$. The upper bolting extension $12^c$ is slotted as indicated at 15 for the reception of the bolt 14 which rigidly clamps the extension $12^c$ to the upper flange of the channel 11. The slot 15 is provided to take care of inaccuracies of alignment between the two holes in the extension $12^c$ and channel 11. The lower bolting extension $12^d$ is secured to the underside of the water box 3 by bolts 16 which tap into a block 17 in the interior of the water box. The arrangement of the block 17 secures a thoroughly water-tight joint at this point, as I shall presently describe. The brackets 12 are substantially the same width as the radiator 1, and thus secure a wide bearing engagement upon the upper flange of the channel 11 and upon the under side of the water box 3.

It will be noted that the long vertical portion, 12a, being spaced from the side of the radiator 1, is free to flex laterally along its entire length, and thus can readily absorb any transverse vibration or motion of the channel 11 tending to close in upon or spread away from the side of the radiator 1, which would tend to create injurious stresses in the core structure 5. In the prior method of suspension wherein rigid bracket members support the radiator on the side channels, this spreading and converging of the side channels is communicated directly to the cellular core structure 5 and is productive of leaks therein by opening the seams of the thin sheet metal core structure.

The oblique portion 12b also has the utility of protecting the core structure by affording a spring slung suspension of the radiator. Vertical shocks are absorbed by the spring action of these oblique portions 12b which are spaced away from the oblique ends of the water box 3.

The lower water box 3 consists of a channel 18 provided with inturned flanges 19 to which the front and rear edges of the core structure 5 are soldered. The ends of this channel are closed by an integral part of the bottom which is inclined upward as indicated at 21 to close the box. The end of the box is thus chamfered off to provide room for the oblique portions 12b of the suspension bracket. Marginal flanges 20 are turned up along the side edges of the inclined ends 21 and are soldered to the sides of the channel 18. The bolting blocks 17 which contact with the sides and the bottom of the channel 18 as shown in Figure 3 are riveted to the bottom of the channel 18 by rivets passing through base flanges on these blocks, as indicated at 22. A water tight strip 23, preferably of soft metal, is interposed between the block 17 and channel 18 to insure complete sealing of the rivet and screw holes in the channel 18. The screws 16 tap only part way into the blocks 17 and are provided with spring washers 24 to lock them in place.

Referring to the upper water box 2, it will be noted that I have provided a distributing channel 26 extending from end to end of the water box and provided with lateral flanges 27 for soldering to the top of the core structure 5. The web of the channel 26 is provided with a series of apertures 28 which have the action of distributing the intake flow over the entire top of the core structure, thereby securing a uniform circulation across the width of the core. The apertures 28 may be of uniform diameter or may be graduated from relatively small apertures at the center to ones of larger diameter at the ends of the channel 26.

It will be apparent that I have provided an improved construction of automobile radiator characterized particularly by an elastic or spring suspension which protects the fragile core structure. The core structure is furthermore strengthened by the flanges 27 of the channel 26, being soldered thereto, which prevents transverse or longitudinal disrupting of the tops of the sheet metal sections of the core. The utility of the spring suspension feature of my invention and the simplicity and low production cost of the radiator as a whole, renders the radiator of particular adaptability to Ford automobiles.

I claim:

1. In combination, a radiator water box, a pair of angle brackets having lower clamping portions clamped against the bottom of the box, vertical portions, intermediate connecting portions between the lower ends of said vertical portions and said lower clamping portions and upper horizontal portions at the upper end of said vertical portions, said upper horizontal portions resting upon a pair of frame members and supporting the radiator in a spring suspension against vertical jars and against lateral shifting of the frame members, the intermediate portions serving to absorb vertical shocks and the vertical portions serving to absorb horizontal shifting of the frame members, said intermediate portions and said vertical portions being spaced from the radiator and from the water box to permit springing of said portions.

2. In combination with an automobile radiator having a water box, a supporting bracket comprising an upper attaching portion adapted to be securely attached to the frame of the automobile, a lower attaching portion adapted to be clamped to the bottom of the water-box of the radiator, and a flat spring portion between said attaching portions extending downwardly directly from the upper attaching portion and out of contact with the radiator partly horizontally and partly vertically to permit of a spring action, both horizontally and vertically.

3. In combination with an automobile radiator, a supporting bracket comprising an upper horizontal portion, which is adapted to be secured to the frame of an automobile, a lower horizontal portion, which is adapted to be clamped against the bottom of the radiator water box, a vertical portion connected integrally at its upper end with the upper horizontal portion and a diagonal portion connecting the lower end of the vertical portion, and the lower horizontal portion, said bracket being made of flat spring material, said vertical portion and said diagonal portion lying out of contact with the radiator.

In witness whereof, I hereunto subscribe my name this 26th day of March, A. D. 1919.

FRED M. OPITZ.